United States Patent
Saunders et al.

(10) Patent No.: US 8,470,482 B2
(45) Date of Patent: Jun. 25, 2013

(54) FUEL PROCESSOR FOR A FUEL CELL ARRANGEMENT AND A METHOD OF OPERATING A FUEL PROCESSOR FOR A FUEL CELL ARRANGEMENT

(75) Inventors: Gary J. Saunders, Derby (GB); Fabio Cerutti, Genoa (IT)

(73) Assignee: LG Fuel Cell Systems Inc., North Canton, OH (US)

( * ) Notice: Subject to any disclaimer, the term of this patent is extended or adjusted under 35 U.S.C. 154(b) by 1 day.

(21) Appl. No.: 13/292,847

(22) Filed: Nov. 9, 2011

(65) Prior Publication Data

US 2012/0082909 A1    Apr. 5, 2012

Related U.S. Application Data

(62) Division of application No. 11/884,229, filed as application No. PCT/GB2006/000487 on Feb. 13, 2006, now Pat. No. 8,147,571.

(30) Foreign Application Priority Data

Mar. 8, 2005   (GB) .................................. 0504755.0

(51) Int. Cl.
*C01B 3/36*    (2006.01)
*C01B 6/24*    (2006.01)
*C01B 3/24*    (2006.01)
*H01M 8/06*    (2006.01)
*H01M 8/04*    (2006.01)

(52) U.S. Cl.
USPC .......... 429/428; 423/644; 423/650; 48/197 R; 429/408

(58) Field of Classification Search
USPC .... 48/61, 197 R, 210; 423/644, 650; 429/408, 429/428
See application file for complete search history.

(56) References Cited

U.S. PATENT DOCUMENTS

| 4,473,622 A | * | 9/1984 | Chludzinski et al. ......... 429/425 |
| 5,302,470 A | * | 4/1994 | Okada et al. ................. 429/410 |
| 6,916,562 B1 | * | 7/2005 | Gosselink et al. ............ 429/415 |
| 2002/0142198 A1 | * | 10/2002 | Towler et al. .................. 429/17 |

(Continued)

FOREIGN PATENT DOCUMENTS

| EP | 1 190 758 A1 | 3/2002 |
| EP | 1 198 020 A2 | 4/2002 |

(Continued)

OTHER PUBLICATIONS

U.S. Appl. No. 11/884,229 filed Aug. 13, 2007.

(Continued)

*Primary Examiner* — Matthew Merkling
(74) *Attorney, Agent, or Firm* — Oliff & Berridge, PLC

(57) ABSTRACT

The fuel processor (10) comprises a desulphurisation reactor (12), a catalytic partial oxidation reactor (14), a combustor (16) and a pre-reformer (18), means (20) to supply a hydrocarbon fuel to the desulphurisation reactor (12), means (24) to supply air to the catalytic partial oxidation reactor (14) and means (24) to supply air to the combustor (16). A method of operating the fuel processor for a fuel cell arrangement includes (a) supplying safe gas to the fuel cell arrangement in a first mode of operation, (b) supplying synthesis gas to the fuel cell arrangement in a second mode of operation and (c) supplying processed hydrocarbon fuel to the fuel cell arrangement in a third mode of operation.

10 Claims, 1 Drawing Sheet

U.S. PATENT DOCUMENTS

| | | | | |
|---|---|---|---|---|
| 2002/0155331 | A1* | 10/2002 | Kamegaya et al. | 429/19 |
| 2003/0000143 | A1* | 1/2003 | Crewdson et al. | 48/127.5 |
| 2003/0138680 | A1* | 7/2003 | Goebel et al. | 429/20 |
| 2004/0023086 | A1* | 2/2004 | Su et al. | 429/17 |

FOREIGN PATENT DOCUMENTS

| | | |
|---|---|---|
| EP | 1 273 552 A2 | 1/2003 |
| JP | A 2002-020103 | 1/2002 |
| JP | A 2002-124286 | 4/2002 |
| JP | A 2002-543033 | 12/2002 |
| JP | A 2003-081603 | 3/2003 |
| WO | WO 00/66487 | 11/2000 |
| WO | WO 01/08247 A1 | 2/2001 |
| WO | WO 02/21623 A1 | 3/2002 |
| WO | WO 02/069428 A1 | 9/2002 |
| WO | WO 03/092102 A1 | 11/2003 |

OTHER PUBLICATIONS

Dec. 7, 2012 Office Action issued in Japanese Patent Application No. 2008-504822 (translation).

* cited by examiner

FUEL PROCESSOR FOR A FUEL CELL ARRANGEMENT AND A METHOD OF OPERATING A FUEL PROCESSOR FOR A FUEL CELL ARRANGEMENT

The present application is a divisional application of U.S. patent application Ser. No. 11/884,229, filed Aug. 13, 2007 now U.S. Pat. No. 8,147,571, which in turn is a U.S. National Phase of PCT/GB2006/000487 filed Feb. 13, 2006. Each of these prior applications is incorporated herein by reference in their entireties.

The present invention relates to a fuel processor for a fuel cell arrangement and a method of operating a fuel processor for a fuel cell arrangement.

It is known from European patent EP0673074B1 to provide a fuel cell arrangement comprising a pre-reformer, which is supplied with anode off gas containing hydrogen and steam from the fuel cells and which is supplied with a hydrocarbon fuel. The pre-reformer comprises a catalyst suitable for low temperature steam reforming of the hydrocarbon fuel and a catalyst for partial oxidation reforming of the hydrocarbon fuel. The pre-reformer also comprises a catalyst suitable for hydrodesulphurisation of the hydrocarbon fuel.

A problem with this arrangement is that at low electrical load conditions, or at open circuit conditions, of the fuel cell arrangement, the fuel cells do not generate steam for the low temperature steam reforming reaction. A further problem with this arrangement is that the hydrodesulphurisation of the hydrocarbon fuel is dependent on the rate of anode off gas, hydrogen, recirculation and this is dependent upon the operating conditions of the fuel cell arrangement.

Accordingly the present invention seeks to provide a novel fuel processor for a fuel cell arrangement and a novel method of operating a fuel processor for a fuel cell arrangement to at least reduce or overcome the above-mentioned problem.

Accordingly the present invention provides a fuel processor for a fuel cell arrangement comprising means to supply safe gas to the fuel cell arrangement in a first mode of operation, means to supply synthesis gas to the fuel cell arrangement in a second mode of operation and means to supply processed hydrocarbon fuel to the fuel cell arrangement in a third mode of operation.

Preferably the fuel processor comprises a desulphurisation reactor, a catalytic partial oxidation reactor, a combustor and a pre-reformer, means to supply a hydrocarbon fuel to the desulphurisation reactor, means to supply air to the catalytic partial oxidation reactor, means to supply air to the combustor, the desulphurisation reactor being arranged to supply desulphurised hydrocarbon fuel to the catalytic partial oxidation reactor, the combustor and to the pre-reformer, the combustor being arranged to supply oxygen depleted air and steam to the pre-reformer, the catalytic partial oxidation reactor being arranged to supply hydrogen to the desulphurisation reactor, the catalytic partial oxidation reactor being arranged to supply the pre-reformer, the pre-reformer being arranged to supply product gases to the fuel cell arrangement.

Alternatively the fuel processor comprises a desulphurisation reactor, a catalytic partial oxidation reactor, a combustor and a pre-reformer, means to supply a hydrocarbon fuel to the desulphurisation reactor, means to supply hydrocarbon fuel to the catalytic partial oxidation reactor, means to supply air to the catalytic partial oxidation reactor, means to supply air to the combustor, the desulphurisation reactor being arranged to supply desulphurised hydrocarbon fuel to the combustor and to the pre-reformer, the combustor being arranged to supply oxygen depleted air and steam to the pre-reformer, the catalytic partial oxidation reactor being arranged to supply hydrogen to the desulphurisation reactor, the pre-reformer being arranged to supply product gases to the fuel cell arrangement.

The present invention also provides a method of operating a fuel processor for a fuel cell arrangement comprising
(a) supplying safe gas to the fuel cell arrangement in a first mode of operation,
(b) supplying synthesis gas to the fuel cell arrangement in a second mode of operation and
(c) supplying processed hydrocarbon fuel to the fuel cell arrangement in a third mode of operation.

The first mode is start up and/or shut down conditions of the fuel cell arrangement.

The second mode is hot idle and/or part load conditions of the fuel cell arrangement.

The third mode is normal conditions of the fuel cell arrangement.

The first mode of operation comprises desulphurising a hydrocarbon fuel, carrying out catalytic partial oxidation on the desulphurised hydrocarbon fuel to produce a synthesis gas, burning the desulphurised hydrocarbon fuel to produce oxygen depleted gas and mixing the synthesis gas with the oxygen depleted gas to produce safe gas.

The second mode of operation comprises desulphurising a hydrocarbon fuel, carrying out catalytic partial oxidation on the desulphurised hydrocarbon fuel to produce a synthesis gas.

The third mode of operation comprises desulphurising a hydrocarbon fuel, carrying out catalytic partial oxidation on the desulphurised hydrocarbon fuel to produce a synthesis gas, mixing the synthesis gas with desulphurised hydrocarbon fuel and pre-reforming the desulphurised hydrocarbon fuel to produce the processed hydrocarbon fuel.

The desulphurising comprises mixing synthesis gas and the hydrocarbon fuel to react hydrogen in the synthesis gas with sulphur compounds in the hydrocarbon fuel to form hydrogen sulphide.

The desulphurising comprises adsorbing the hydrogen sulphide.

The pre-reforming of the desulphurised hydrocarbon fuel comprises hydrogenolysis.

The safe gas comprises low partial pressures of hydrogen and carbon monoxide. The safe gas contains approximately 5 vol % flammable gases and the remainder is non-flammable gases.

The synthesis gas comprises high partial pressures of hydrogen and carbon monoxide. The synthesis gas contains approximately 33 vol % hydrogen and 17 vol % carbon monoxide and the remainder is non-flammable gases.

The present invention will be more fully described by way of example with reference to the accompanying drawings in which.

Figure 1:
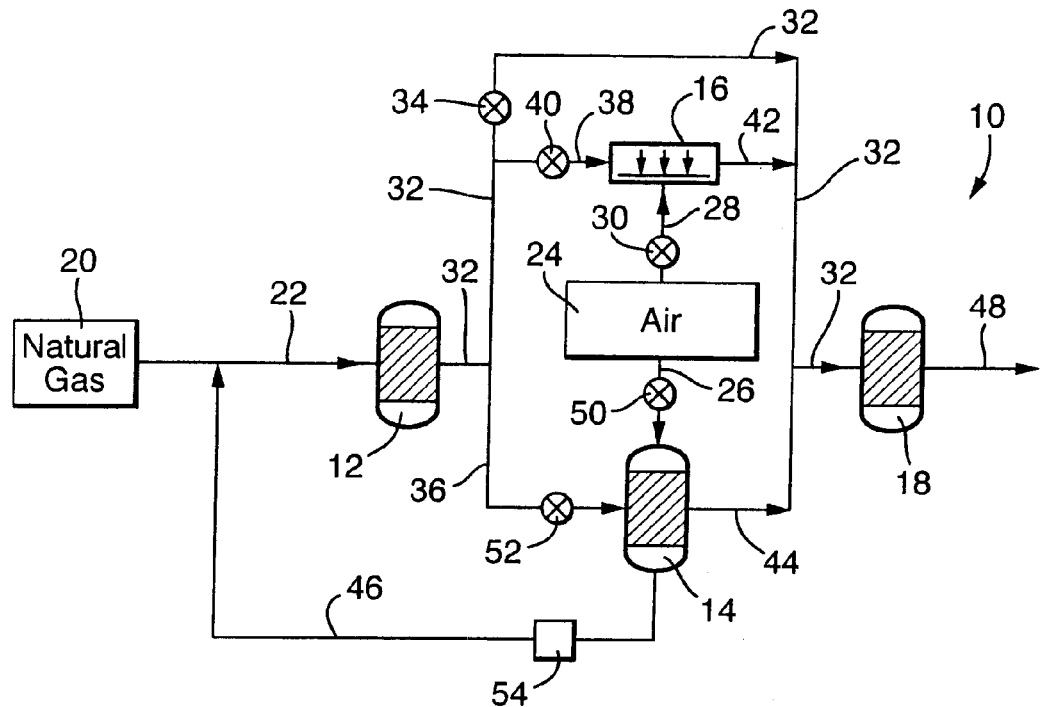
FIG. 1 shows a fuel processor according to the present invention.

A fuel processor 10 for a fuel cell arrangement according to the present invention, as shown in FIG. 1, comprises a hydrodesulphurisation reactor 12, a catalytic partial oxidation reactor 14, a combustor 16 and a pre-reformer 18. There are means 20 to supply a hydrocarbon fuel to the hydrodesulphurisation reactor 12 via a pipe 22 and there are means 24 to supply air to the catalytic partial oxidation reactor 14 via a pipe 26 and means 24 to supply air to the combustor 16 via a pipe 28 and a valve 30. The hydrodesulphurisation reactor 12 is connected to the pre-reformer 18 via a pipe 32 and a valve 34. The hydrodesulphurisation reactor 12 is connected to the catalytic partial oxidation reactor 14 via pipes 32 and 36. The hydrodesulphurisation reactor 12 is also connected to the combustor 16 via pipes 32 and 38 and a valve 40. The combustor 16 is connected to the pre-reformer 18 via pipes 42 and 32. The catalytic partial oxidation reactor 14 is connected to the pre-reformer 18 via pipes 44 and 32. The catalytic partial oxidation reactor 14 is connected to the hydrodesulphurisation reactor 12 via a pipe 46 and a recirculating means 54, the recirculating means may comprise an ejector, a fan, a pump etc. The pre-reformer 18 is connected to supply product gases to the fuel cell arrangement or, a further device, via a pipe 48.

The means 20 to supply hydrocarbon fuel for example is a supply of natural gas. The means 24 to supply air may be an air compressor, or pump, or an air source within the pressure vessel of the fuel cell arrangement.

In addition a valve 50 may be provided in pipe 26 and a valve 52 may be provided in pipe 36 in order to isolate the catalytic partial oxidation reactor 14 if necessary.

The fuel processor 10 is arranged to perform a number of functions. Firstly the fuel processor 10 is arranged to remove sulphur from the hydrocarbon fuel such that the concentration of sulphur can be tolerated by the catalysts and components of the fuel cells. Secondly the fuel processor 10 is arranged to convert the hydrocarbon into a gas mixture, which contains low partial pressures of hydrogen and carbon monoxide, also known as "safe gas". The "safe gas" contains approximately 5 vol % flammable gases and the remainder is non-flammable gases. Thirdly the fuel processor 10 is arranged to convert hydrocarbon fuel into a gas mixture, which contains high partial pressures of hydrogen and carbon monoxide, also known as "synthesis gas or syngas". The "synthesis gas" contains approximately 33vol % hydrogen and 17 vol % carbon monoxide and the remainder is non-flammable gases. Lastly the fuel processor 10 is arranged to remove higher hydrocarbons, including ethane, ethene, propane, propene, butane, butene, etc by converting them into methane.

The catalytic partial oxidation reactor 14 is arranged to continuously provide hydrogen to the hydrodesulphurisation reactor 12. The catalytic partial oxidation reactor 14 is arranged to provide hydrogen to the pre-reformer 18 during start up of the fuel cell arrangement. During start up of the fuel cell arrangement the hydrogen and carbon monoxide is combined with an excess of non-flammable gases to form the safe gas. The catalytic partial oxidation reactor 14 is also arranged to provide hydrogen and carbon monoxide to the fuel cell arrangement during hot idle conditions and part load conditions of the fuel cell arrangement. During hot idle conditions and part load conditions of the fuel cell arrangement the hydrogen and carbon monoxide is combined with non-flammable gases to form the synthesis gas.

The combustor 16 is arranged to provide oxygen depleted air and steam to the pre-reformer 18 during start up and shut down of the fuel cell arrangement. The combustor 16 may also provide heat to the other reactors during start up such that those reactors reach operational temperature as quickly as possible.

The pre-reformer 18 is arranged to provide pre-reforming of higher hydrocarbons, those with more than one carbon atom, to prevent thermal cracking of the higher hydrocarbons in the fuel cell arrangement. The pre-reforming of the higher hydrocarbons is by hydrogenolysis, steam reforming, carbon dioxide reforming, catalytic partial oxidation or any combination of these reactions. The dominant reaction is hydrogenolysis.

In operation hydrocarbon fuel, for example natural gas, is supplied from the means 20 to supply hydrocarbon fuel to the hydrodesulphurisation reactor 12 via pipe 22. Initially the catalytic partial oxidation reactor 14 is supplied with the hydrocarbon fuel, natural gas, from the hydrodesulphurisation reactor 12 via pipes 32 and 36 without any sulphur being removed, the valves 50 and 52 being open. The catalytic partial oxidation reactor 14 is designed to accommodate, or tolerate, some sulphur poisoning of the catalysts. In addition the catalytic partial oxidation reactor 14 is supplied with air from the means 24 to supply air via pipe 26. The air is supplied to the catalytic partial oxidation reactor 14 at an appropriate air to fuel ratio. The catalytic partial oxidation reactor 14 converts the hydrocarbon fuel, natural gas, and air into a gas stream, which contains a high partial pressure of hydrogen and carbon monoxide, e.g. synthesis gas. The gas stream contains hydrogen, water, carbon monoxide, carbon dioxide and nitrogen.

The hydrodesulphurisation reactor 12 is supplied with the gas stream, synthesis gas, containing a high partial pressure of hydrogen and carbon monoxide by the catalytic partial oxidation reactor 14 via the pipes 46 and 22 and the recirculating means 54 and this is mixed with the hydrocarbon fuel, natural gas, supplied by the means 20 to supply hydrocarbon fuel. The hydrogen supplied by the catalytic partial oxidation reactor 14 reacts with sulphur compounds present in the hydrocarbon fuel, natural gas, and converts the sulphur compounds into hydrogen sulphide. The hydrogen sulphide is adsorbed onto a bed of zinc oxide in the hydrodesulphurisation reactor 12. The hydrocarbon fuel, natural gas, supplied from the hydrodesulphurisation reactor 12 then contains a very low concentration of sulphur.

The supply of hydrocarbon fuel from the desulphurisation reactor 12 to the catalytic partial oxidation reactor 14 and the recirculation of synthesis gas to the desulphurisation reactor 12 from the catalytic partial oxidation reactor 14 occurs during all modes of operation of the fuel processor 10.

During start up and shut down conditions of the fuel cell arrangement, the combustor 16 is supplied with desulphurised hydrocarbon fuel, natural gas, via pipes 32 and 38 and valve 40. Air is supplied from the means 24 to supply air to the combustor 24 via the pipe 28 and valve 30. The hydrocarbon fuel, natural gas, is burned in the air to produce a gas stream depleted of oxygen. The gas stream depleted of oxygen is supplied by the combustor 16 via pipes 42 and 32 to the pre-reformer 18 and at the same time a major portion of the "synthesis gas" is supplied by the catalytic partial oxidation reactor 14 via pipes 44 and 32 to the pre-reformer 18 to mix with the gas stream depleted of oxygen produce a reducing gas mixture that contains approximately 5 vol % flammable gases, e.g. "safe gas". The safe gas is supplied from the pre-reformer 18 to the fuel cell arrangement via pipe 48. "Safe gas" is supplied to the fuel cell arrangement if the temperature of the solid oxide fuel cell arrangement is higher than 350° C. and does not require "synthesis gas" or "processed methane". A minor portion of the "synthesis gas" is supplied to the desulphurisation reactor 12 via pipes 46 and 22 and the recirculating means 54. During this mode of operation the valves 30 and 40 are open, the valve 34 is closed and valves 50 and 52 are open.

During hot idle and part load conditions of the fuel cell arrangement, there is insufficient steam in the recirculated fuel cell anode off gas to perform steam-methane reforming in the reformer in the fuel cell arrangement. A fuel processor is required that does not require steam reforming. During hot idle and part load conditions of the fuel cell arrangement, the desulphurisation reactor 12 increases the supply of desulphurised hydrocarbon fuel, natural gas, to the catalytic partial oxidation reactor 14 via the pipes 32 and 36 and valve 52. The catalytic partial oxidation reactor 14 supplies a major portion of the "synthesis gas" to the pre-reformer 18 via pipes 44 and 32 and a minor portion of the "synthesis gas" to the desulphurisation reactor 12 via pipes 46 and 22 and the recirculating means 54. The valves 30, 34 and 40 are closed. The catalytic partial oxidation reactor 14 supplies the major portion of the "synthesis gas" to the fuel cell arrangement via the pre-former 18 and pipes 44, 32 and 48.

During normal conditions of the fuel cell arrangement, there is sufficient steam in the recirculated fuel cell anode off gas to perform steam-methane reforming in the reformer in the fuel cell arrangement. A fuel processor is required that provides a fuel supply that is mainly methane and contains as low a concentration of sulphur compounds and higher hydrocarbons as is possible. During normal conditions of the fuel cell arrangement, the hydrodesulphurisation reactor 12 is arranged to supply sufficient desulphurised hydrocarbon fuel, natural gas, to the catalytic partial oxidation reactor 14 via pipes 32 and 36 and the valve 52 such that sufficient hydrogen, "synthesis gas" is produced by the catalytic partial oxidation reactor 12 and supplied to the hydrodesulphurisation reactor 12 via pipes 46 and 22 and the recirculating means 54 to then allow the hydrodesulphurisation reactor 12 to desulphurise the hydrocarbon fuel, natural gas. The remaining "synthesis gas" is supplied by the catalytic partial oxidation reactor 14 to the pre-reformer 18 via pipes 44 and 32. In addition the hydrodesulphurisation reactor 12 supplies desulphurised hydrocarbon fuel to the pre-reformer 18 via the pipe 32 and valve 34. The pre-reformer 18 converts the higher hydrocarbons in the hydrocarbon fuel, natural gas, to methane substantially by hydrogenolysis and the pre-reformer 18 supplies the methane to the fuel cell arrangement via pipe 48. The valves 30 and 40 are closed.

The hydrodesulphurisation reactor 12 comprises zinc oxide and copper doped zinc oxide to adsorb the hydrogen sulphide and hydrodesulphurisation catalysts, e.g. nickel molybdate and/or cobalt molybdate.

The catalytic partial oxidation reactor 14 comprises partial oxidation catalysts, e.g. one or more of cobalt, nickel, iron, platinum, rhodium, ruthenium or molybdenum.

The pre-reformer 18 comprises pre-reforming catalysts, hydrogenolysis catalysts e.g. nickel or cobalt.

The advantages of the present invention are that under low load conditions or open circuit conditions of the fuel cell arrangement the fuel processor supplies "synthesis gas" to the fuel cell arrangement and this does not require any further processing by the fuel cell arrangement, e.g. no steam is required. The catalytic partial oxidation reactor provides a controlled desulphurisation process independent of the conditions of the fuel cell arrangement and does not need to follow the load conditions of the fuel cell arrangement.

Further advantages are that the pre-reformer principally uses hydrogenolysis to convert the higher hydrocarbon fuel to methane. Hydrogenolysis does not require an external supply of water or steam, as does steam reforming, and does not require careful control of the reaction conditions to selectively process higher hydrocarbon fuels and not methane.

Additional advantages are that the integration of the hydrodesulphurisation reactor, combustor, partial oxidation reactor and pre-reformer results in a simpler fuel processor process and a reduction in parts. Heat management is easier, the heat produced in one reactor may be used by another reactor. The result is the loss in lower heating value of the hydrocarbon fuel, natural gas, is minimised.

Hydrogenolysis is ordinarily a reaction in which hydrogen reacts with a hydrocarbon molecule with single bonds between the carbon atoms to break the carbon bond to produce two other lower hydrocarbon molecules.

| | |
|---|---|
| propane+hydrogen=ethane+methane, | Example 1 |
| toluene+hydrogen=benzene+methane, | Example 2 |
| butane+hydrogen=ethane+ethane. | Example 3 |

Figure 2:
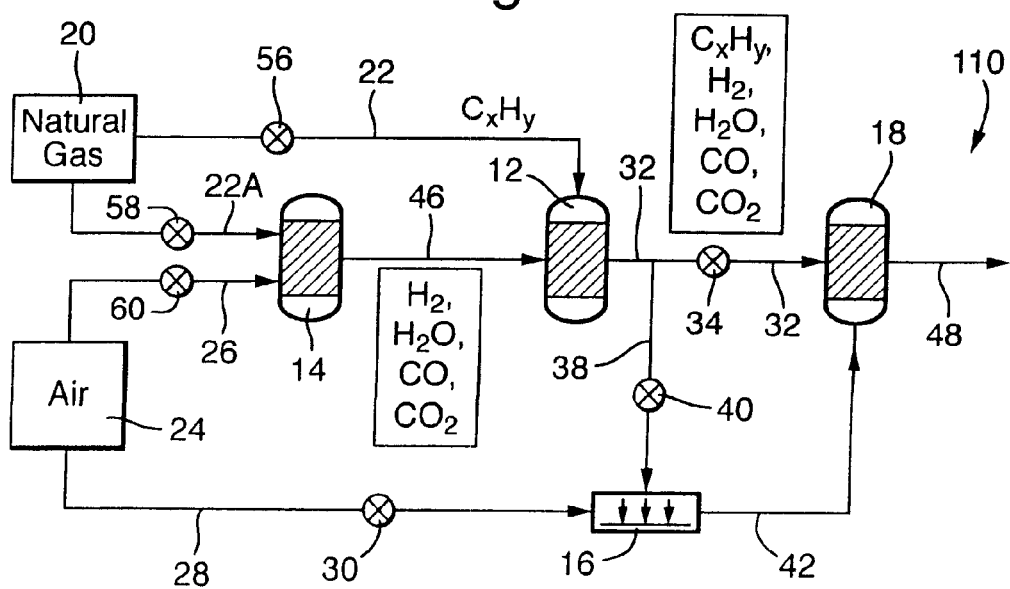
FIG. 2 shows an alternative fuel processor according to the present invention.

An alternative fuel processor 110 for a fuel cell arrangement according to the present invention, as shown in FIG. 2, comprises a hydrodesulphurisation reactor 12, a catalytic partial oxidation reactor 14, a combustor 16 and a pre-reformer 18. There are means 20 to supply a hydrocarbon fuel to the hydrodesulphurisation reactor 12 via a pipe 22 and valve 56 and there are means 24 to supply air to the catalytic partial oxidation reactor 14 via a pipe 26 and valve 60 and means 24 to supply air to the combustor 16 via a pipe 28 and a valve 30. The hydrodesulphurisation reactor 12 is connected to the pre-reformer 18 via a pipe 32 and a valve 34. The catalytic partial oxidation reactor 14 is connected to the means 20 to supply hydrocarbon fuel via a pipe 22A and valve 58. The hydrodesulphurisation reactor 12 is also connected to the combustor 16 via pipes 32 and 38 and a valve 40. The combustor 16 is connected to the pre-reformer 18 via pipe 42. The catalytic partial oxidation reactor 14 is connected to the pre-reformer 18 via pipe 46, the hydrodesulphurisation reactor 12, pipe 32 and valve 34. The catalytic partial oxidation reactor 14 is connected to the hydrodesulphurisation reactor 12 via a pipe 46. The pre-reformer 18 is connected to supply product gases to the fuel cell arrangement, or a further device, via a pipe 48.

The fuel processor 110 operates in substantially the same way as described with reference to FIG. 1. It differs in that the catalytic partial oxidation reactor 14 does not recirculate a portion of the "synthesis gas" to the hydrodesulphurisation reactor 12 rather it supplies all the "synthesis gas" to the hydrodesulphurisation reactor 12. In addition the catalytic partial oxidation reactor 14 is supplied with undesulphurised hydrocarbon fuel, natural gas, and thus the catalytic partial oxidation reactor 14 would have to be tolerant, or more tolerant, to sulphur compounds for the lifetime of the fuel processor 110 or the catalytic partial oxidation processor 14 would have to be replaced at intervals.

The fuel processor is applicable to the supply of fuel to a fuel cell arrangements, in particular a solid oxide fuel cell arrangements. However, the fuel processor may also be suitable for the supply of fuel to other chemical processes.

The invention claimed is:

1. A method of operating a fuel processor for a fuel cell arrangement comprising
    (a) supplying safe gas to the fuel cell arrangement in a first mode of operation,
    (b) supplying synthesis gas to the fuel cell arrangement in a second mode of operation and
    (c) supplying processed hydrocarbon fuel to the fuel cell arrangement in a third mode of operation
    wherein the first mode of operation comprises desulphurising a hydrocarbon fuel, carrying out catalytic partial oxidation on the desulphurised hydrocarbon fuel to produce a synthesis gas, burning the desulphurised hydrocarbon fuel to produce oxygen depleted gas and mixing the synthesis gas with the oxygen depleted gas to produce safe gas.

2. A method as claimed in claim 1 wherein the first mode is start up and/or shut down conditions of the fuel cell arrangement.

3. A method as claimed in claim 1 wherein the second mode is hot idle and/or part load conditions of the fuel cell arrangement.

4. A method as claimed in claim 1 wherein the third mode is normal conditions of the fuel cell arrangement.

5. A method as claimed in claim 1 wherein the second mode of operation comprises desulphurising a hydrocarbon fuel, carrying out catalytic partial oxidation on the desulphurised hydrocarbon fuel to produce a synthesis gas.

6. A method as claimed in claim 1 wherein the third mode of operation comprises desulphurising a hydrocarbon fuel, carrying out catalytic partial oxidation on the desulphurised hydrocarbon fuel to produce a synthesis gas, mixing the synthesis gas with desulphurised hydrocarbon fuel and pre-reforming the desulphurised hydrocarbon fuel to produce the processed hydrocarbon fuel.

7. A method as claimed in claim 1 wherein the desulphurising comprises mixing synthesis gas and the hydrocarbon fuel to react hydrogen in the synthesis gas with sulphur compounds in the hydrocarbon fuel to form hydrogen sulphide.

8. A method as claimed in claim 7 wherein the desulphurising comprises adsorbing the hydrogen sulphide.

9. A method as claimed in claim 6 wherein the pre-reforming of the desulphurised hydrocarbon fuel comprises hydrogenolysis.

10. A method of operating a fuel processor for a fuel cell arrangement comprising:
 (a) supplying safe gas to the fuel cell arrangement in a first mode of operation,
 (b) supplying synthesis gas to the fuel cell arrangement in a second mode of operation, and
 (c) supplying processed hydrocarbon fuel to the fuel cell arrangement in a third mode of operation;
 wherein the third mode of operation comprises desulphurising a hydrocarbon fuel, carrying out catalytic partial oxidation on the desulphurised hydrocarbon fuel to produce a synthesis gas, mixing the synthesis gas with desulphurised hydrocarbon fuel and pre-reforming the desulphurised hydrocarbon fuel to produce the processed hydrocarbon fuel.

* * * * *